(12) United States Patent
Yuasa

(10) Patent No.: US 8,103,818 B2
(45) Date of Patent: Jan. 24, 2012

(54) MEMORY MODULE AND AUXILIARY MODULE FOR MEMORY

(75) Inventor: Kaoru Yuasa, Nagoya (JP)

(73) Assignee: Buffalo Inc., Nagoya (JP)

( * ) Notice: Subject to any disclaimer, the term of this patent is extended or adjusted under 35 U.S.C. 154(b) by 315 days.

(21) Appl. No.: 12/572,886

(22) Filed: Oct. 2, 2009

(65) Prior Publication Data

US 2010/0088487 A1    Apr. 8, 2010

(30) Foreign Application Priority Data

Oct. 8, 2008 (JP) .................. 2008-261521

(51) Int. Cl.
*G06F 12/00* (2006.01)
(52) U.S. Cl. .......................................... 711/5
(58) Field of Classification Search ................ None
See application file for complete search history.

(56) References Cited

U.S. PATENT DOCUMENTS 5,761,694 A * 6/1998 Rao .................................. 711/5
7,755,967 B2 * 7/2010 Kunce et al. ................ 365/222

FOREIGN PATENT DOCUMENTS

JP    2004-94785    3/2004
JP    2005-62914    3/2005

* cited by examiner

*Primary Examiner* — Hiep Nguyen
(74) *Attorney, Agent, or Firm* — Beyer Law Group LLP

(57) ABSTRACT

In a memory module 100, an address generating circuit 120, using the highest order bit of a row address output by a memory controller 12, will generate a highest order bit BA2 of a bank address insufficient for the purpose of identification of a memory cell targeted for access, and will output the bit to SDRAM 110. An operating mode detector 130 detects the operating mode of the memory controller 12. A switch controller 40 will switch a switch 128 on the basis of the detected operating mode.

18 Claims, 11 Drawing Sheets

1T OPERATION

SMALL MARGIN

2T OPERATION

LARGE MARGIN

Fig.8

| ENVIRONMENT | MIXED INSTALLATION-COMPATIBLE PC | | MIXED INSTALLATION-INCOMPATIBLE PC | |
|---|---|---|---|---|
| OPERATING MODE | 1T OPERATION | 2T OPERATION | 1T OPERATION | 2T OPERATION |
| NORMAL MODE | NORMAL OPERATION | NORMAL OPERATION | NORMAL OPERATION<br>MEMORY MODULE ON 512Mbit SDRAM SIDE WILL NOT BE RECOGNIZED | NORMAL OPERATION<br>MEMORY MODULE ON 512Mbit SDRAM SIDE WILL NOT BE RECOGNIZED |
| VIRTUAL MODE | ABNORMAL OPERATION (HANGING ETC.) | NORMAL OPERATION | ABNORMAL OPERATION (HANGING ETC.) | NORMAL OPERATION |
| | ⇩ | ⇩ | ⇩ | ⇩ |
| | NORMAL MODE REQUIRED | NORMAL MODE/ VIRTUAL MODE OK | NORMAL MODE REQUIRED | VIRTUAL MODE REQUIRED |

COMMAND ADDRESS AT t(0) ≠ COMMAND ADDRESS AT t(-1)
↓
1T OPERATION

COMMAND ADDRESS AT t(0) = COMMAND ADDRESS AT t(-1)
AND
COMMAND ADDRESS AT t(-1) ≠ COMMAND ADDRESS AT t(-2)
↓
2T OPERATION

MEMORY MODULE AND AUXILIARY MODULE FOR MEMORY

BACKGROUND

1. Technical Field

The present invention relates to a memory module and to an auxiliary module for memory.

2. Related Art

Memory modules composed of multiple semiconductor memory chips that have been mounted and interconnected on a circuit board, and provided with connector terminals for connection to a computer, have enjoyed widespread use for some time. SDRAM (Synchronous Dynamic Random Access Memory) is one type of memory with which these kinds of memory modules may be equipped. An SDRAM is internally divided into several banks, with each bank being operable independently. In SDRAM, memory cells targeted for access are identified by a bank address, a row address, and a column address which have been output by a memory controller provided to the computer. The bank address is input to the SDRAM using a bank address signal line, while the row address and the column address are input to the SDRAM using a shared signal line. The row address and the column address are input to the SDRAM over two cycles, in the order of row address followed by column address.

The numbers of memory cells in memory modules have seen an increase in association with the larger memory capacities, which in turn will cause a change in the number of bits of the bank address, the number of bits of the row address, and the number of bits of the column address which are used for identifying memory cells targeted for access. For example, if the number of banks is doubled, there will be a one-bit increase in the number of bits in the bank address. A resultant drawback is that where a memory module equipped with large capacity memory is connected to a computer whose memory controller is not compatible with such a memory module, i.e. where the numbers of bits of the addresses output by the memory controller do not match the numbers of bits of the addresses for identifying memory cells targeted for access, the computer (the memory controller) will only be able to access a portion of the memory cells in the memory module.

Accordingly, there have been proposed a number of technologies for use in memory modules, intended to enable access to all memory cells of the memory module even in instances where the numbers of bits of the addresses that are output by the memory controller do not respectively match the numbers of bits of the addresses for identifying memory cells targeted for access.

However, even according to the technologies taught in the aforementioned technologies, there were instances where memory module failed to operate normally.

An advantage of some aspects of the invention is to enable access to all memory cells of a memory module and to carry out normal operation of the memory module, even in instances where the number of bits of the bank address, the number of bits of the row address, and the number of bits of the column address that are output by the memory controller do not respectively match the number of bits of the bank address, the number of bits of the row address, and the number of bits of the column address for identifying memory cells targeted for access.

The entire disclosure of Japanese patent application No. 2008-261521 of BUFFALO is hereby incorporated by reference into this document.

SUMMARY

The invention is addressed to attaining the above objects at least in part according to the following modes.

A memory module comprising:

memory that has a plurality of banks containing a plurality of memory cells arranged in a matrix array, wherein each of the memory cells that is targeted for access is identified on the basis of a bank address composed of a prescribed number of bits, a row address composed of a prescribed number of bits, and a column address composed of a prescribed number of bits, the addresses being input from a memory controller;

an address generator configured to be able to generate a highest order bit of a bank address to be utilized for identification of the memory cell targeted for access, using a highest order bit of a row address that is output by the memory controller, and to be able to output the highest order bit of the bank address to the memory, in case where (i) a sum of a number of bits of the bank address, a number of bits of the row address, and a number of bits of the column address that have been output by the memory controller is equal to a sum of the number of bits of the bank address, the number of bits of the row address, and the number of bits of the column address that are utilized for identification of the memory cell targeted for access;

(ii) the number of bits of the row address that is output by the memory controller exceeds by one the number of bits of the row address that is utilized for identification of the memory cell targeted for access; and (iii) the number of bits of the bank address that is output by the memory controller is less by one than the number of bits of the bank address that is utilized for identification of the memory cell targeted for access;

an operating mode detector configured to detect an operating mode of access to the memory by the memory controller; and an address generating controller configured to control the address generator based on the operating mode detected by the operating mode detector.

The following aspect is also preferable.

A memory module comprising:

memory that has a plurality of banks containing a plurality of memory cells arranged in a matrix array, wherein each of the memory cells that is targeted for access is identified on the basis of a bank address composed of a prescribed number of bits, a row address composed of a prescribed number of bits, and a column address composed of a prescribed number of bits, the addresses being input from a memory controller;

an address generator configured to be able to generate a highest order bit of a column address to be utilized for identification of the memory cell targeted for access, using a highest order bit of a row address that is output by the memory controller, and to be able to output the highest order bit of the column address to the memory, in case where (i) a sum of a number of bits of the bank address, a number of bits of the row address, and a number of bits of the column address that have been output by the memory controller is equal to a sum of the number of bits of the bank address, the number of bits of the row address, and the number of bits of the column address that are utilized for identification of the memory cell targeted for access;

(ii) the number of bits of the row address that is output by the memory controller exceeds by one the number of bits of the row address that is utilized for identification of the memory cell targeted for access; and (iii) the number of bits of the column address that is output by the memory controller is less by one than the number of bits of the column address that is utilized for identification of the memory cell targeted for access;

an operating mode detector configured to detect an operating mode of access to the memory by the memory controller; and an address generating controller configured to control the address generator based on the operating mode detected by the operating mode detector.

These and other objects, features, aspects, and advantages of the present invention will become more apparent from the following detailed description of the preferred embodiments with the accompanying drawings.

BRIEF DESCRIPTION OF THE DRAWINGS

FIG. 8 depicts operating conditions of the memory module 100 in various cases;

DESCRIPTION OF EXEMPLARY EMBODIMENT

The invention will be described hereinbelow based on certain preferred embodiments.

A. Embodiment 1

Figure 1:
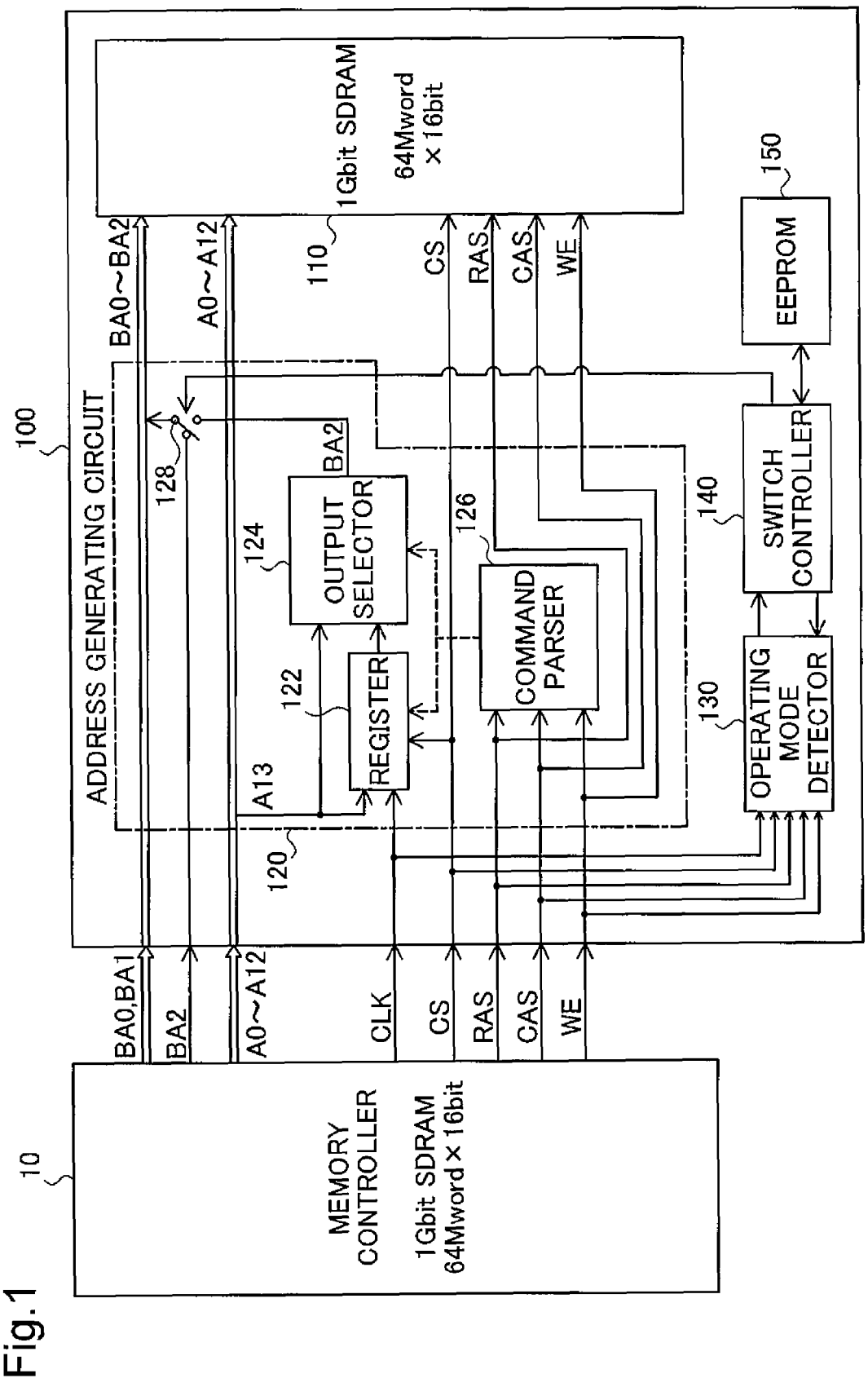
FIG. 1 depicts a general configuration of a memory module 100 according to a first embodiment of the invention.
Figure 2:
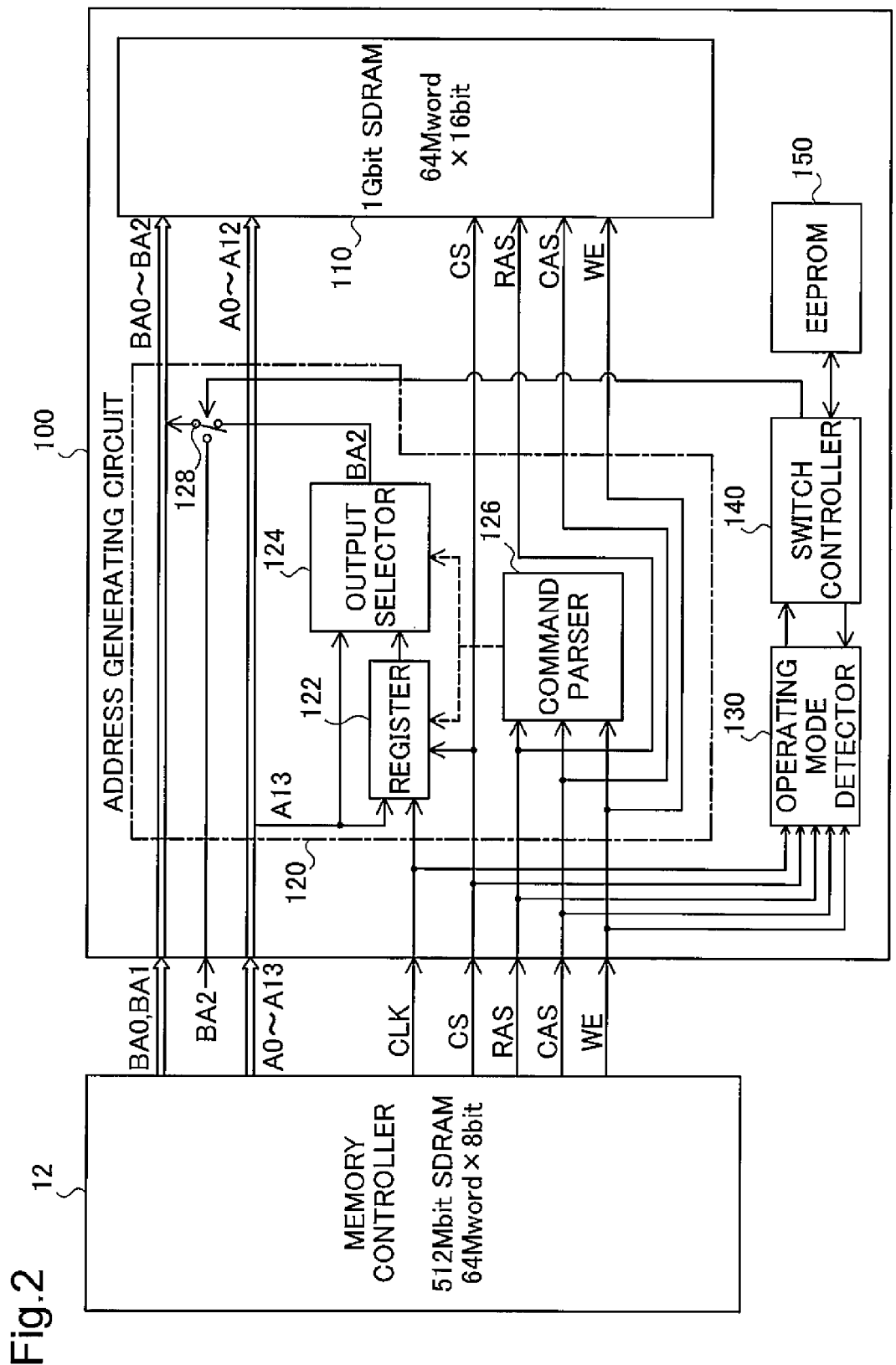
FIG. 2 depicts a general configuration of a memory module 100 according to a first embodiment of the invention.

FIG. 1 and FIG. 2 depict general configurations of a memory module 100 according to a first embodiment of the invention. FIG. 1 depicts the memory module 100 connected to a memory controller 10. FIG. 2 depicts the memory module 100 connected to a memory controller 12. The differences between these configurations will be discussed later.

As shown, the memory module 100 includes an SDRAM 110, an address generating circuit 120, an operating mode detector 130, a switch controller 140, and an EEPROM 150. The description turns first to the SDRAM 110 and the address generating circuit 120 in the memory module 100, and to typical operations of these components; and will then turn to the operating mode detector 130, the switch controller 140, the EEPROM 150, and the operations of these components.

In the present embodiment, 1 gigabit (64 megawords×16 bits) DDR2 (Double Data Rate 2) SDRAM is employed as the SDRAM 110. As will be discussed later, this SDRAM 110 is divided internally into eight banks, with each bank being operable independently. 3-bit bank addresses (BA0-BA2), 13-bit row addresses (A0-A12), and 10-bit column addresses (A0-A9) have been input to the SDRAM 110, and memory cells targeted for access are identified on the basis of these addresses. Because the row address and the column address, in the order row address followed by column address, are input to the SDRAM 110 over two cycles using a common signal line, the shared symbol "A" has been prefixed to the symbols for row address and column address.

In addition to the addresses mentioned above, various signals used for operations of the SDRAM 110, such as a chip select signal (CS), a row address strobe signal (RAS), a column address strobe signal (CAS), and a write enable signal (WE), as well as a clock signal and a clock enable signal (not shown) are input to the SDRAM 110. The memory module 100 is additionally provided with data input pins and interconnects, not shown, for the purpose of input and output of data between the memory controller and the SDRAM 110.

As shown in FIGS. 1 and 2, the memory module 100 of the present embodiment may be connected to the memory controller 10 or to the memory controller 12.

The memory controller 10 is one that is compatible with 1 gigabit (64 megaword×16 bit) DDR2 SDRAM (SDRAM 110); as depicted in FIG. 1, it is designed to output a 3-bit bank address (BA0-BA2), a 13-bit row address (A0-A12), and a 10-bit column address (A0-A9). That is, the number of bits of each address output by the memory controller 10 matches the number of bits of each address utilized for identification of memory cells targeted for access.

The memory controller 12, on the other hand, is compatible with 512 megabit (64 megaword×8 bit) DDR2 SDRAM that is internally divided into four banks; as depicted in FIG. 2, it is designed to output a 2-bit bank address (BA0, BA1), a 14-bit row address (A0-A13), and a 10-bit column address (A0-A9). That is, the number of bits of addresses output by the memory controller 12 do not all match the number of bits of addresses utilized for identification of memory cells targeted for access; rather, while the sum of the number of bits of the addresses that are output by the memory controller 12 is equal to the sum of the number of bits of the addresses that are utilized for identification of memory cells targeted for access in the SDRAM 110. The number of bits of the row address that is output by the memory controller 12 exceeds by one bit the number of bits of the row address that is utilized for identification of memory cells targeted for access. The number of bits of the bank address that is output by the memory controller 12 is less by one bit than the number of bits of the bank address that is utilized for identification of memory cells targeted for access.

The address generating circuit 120 is provided to the memory module 100 for the purpose of eliminating discrepancy of the number of bits between the addresses output by the memory controller 12 and the addresses input to the SDRAM 110, when the memory module 100 has been connected to the memory controller 12.

The address generating circuit 120 is provided with a register 122, an output selector 124, a command parser 126, and a switch 128.

The command parser 126 is designed to parse commands for selecting an access method to the SDRAM 110, based on row address strobe signals (RAS), column address strobe signals (CAS), and write enable signals (WE) output by the memory controller 12, and to then output the parsed commands to the register 122 and the output selector 124. These commands are known commands used for control of SDRAM operations, examples of these commands being: all bank precharge; selected bank precharge; refresh; load mode register; active; read; write, etc.

In case where the memory module 100 is connected to the memory controller 12, on the basis of the command input from the command parser 126, the register 122 will temporarily save in memory the highest order bit (A13) of the row address that was output by the memory controller 12, or will reset. When the clock signal (CLK) and the chip select signal (CS) are input to the register 122 and the input chip select signal (CS) is "L" level, then in sync with the timing of the rising edge of the clock signal (CLK), the register 122 will determine the input command from the command parser 126. As will be discussed later, because the eight banks of the SDRAM 110 are treated as four banks, the address generating circuit 120 is provided with four respectively corresponding registers 122; however, these have been omitted in the illustration.

On the basis of the command input from the command parser 126, the output selector 124 will select either the highest order bit of the row address that was output by the memory controller 12 or the highest order bit of the row address that was saved to the register 122, and output this bit to the SDRAM 110 by way of the highest order bit (BA2) of the bank address that is insufficient for the purpose of identification of the memory cell targeted for access. Specifically, the following processes are performed by the output selector 124.

The "active" command from among commands issued by the memory controller 12 involves the row address designation. When the command received from the command parser 126 (corresponding to the command issued by the memory controller 12) is the "active" command, the output selector 124 selects the highest order bit of the row address that was output by the memory controller 12 and output this bit to the SDRAM 110 as the highest order bit (BA2) of the bank address.

Meanwhile, the "load mode register" command, the "read" command and the "write" command issued by the memory controller 12 do not involve the row address designation. Consequently, when these commands are issued, the output selector 124 can not output the highest order bit of the row address that was output by the memory controller 12 to the SDRAM 110 as the highest order bit (BA2) of the bank address. When the command received from the command parser 126 (corresponding to the command issued by the memory controller 12) is the "load mode register" command, the "read" command or the "write" command, the output selector 124 selects the highest order bit of the row address stored in the register 122 and outputs this bit to the SDRAM 110 as the highest order bit (BA2) of the bank address. In the register 122, the highest order bit of the row address that was output by the memory controller 12 was saved, when the "active" command is issued. These processes are described below.

By providing the memory module 100 with this sort of address generating circuit 120, even in the event that the memory module 100 has been hooked up to the memory module 12 that is not compatible with the SDRAM 110 (i.e. with 1 gigabit (64 megaword×16 bit) DDR2 SDRAM), all of the addresses for the purpose of identifying memory cells targeted for access will be input to the SDRAM 110 just as if it were hooked up to the memory module 10, and thus the SDRAM 110 will be able to operate normally.

In the present embodiment, a control mode of the memory module 100 whereby the highest order bit BA2 of a bank address that has been generated by the address generating circuit 120 will be output to the SDRAM 110 as depicted in FIG. 2 shall be referred to as "virtual mode." A control mode of the memory module 100 whereby the highest order bit BA2 of a bank address that has been generated by the address generating circuit 120 will not be output to the SDRAM 110 as depicted in FIG. 1 shall be referred to as "normal mode."

Figure 3:
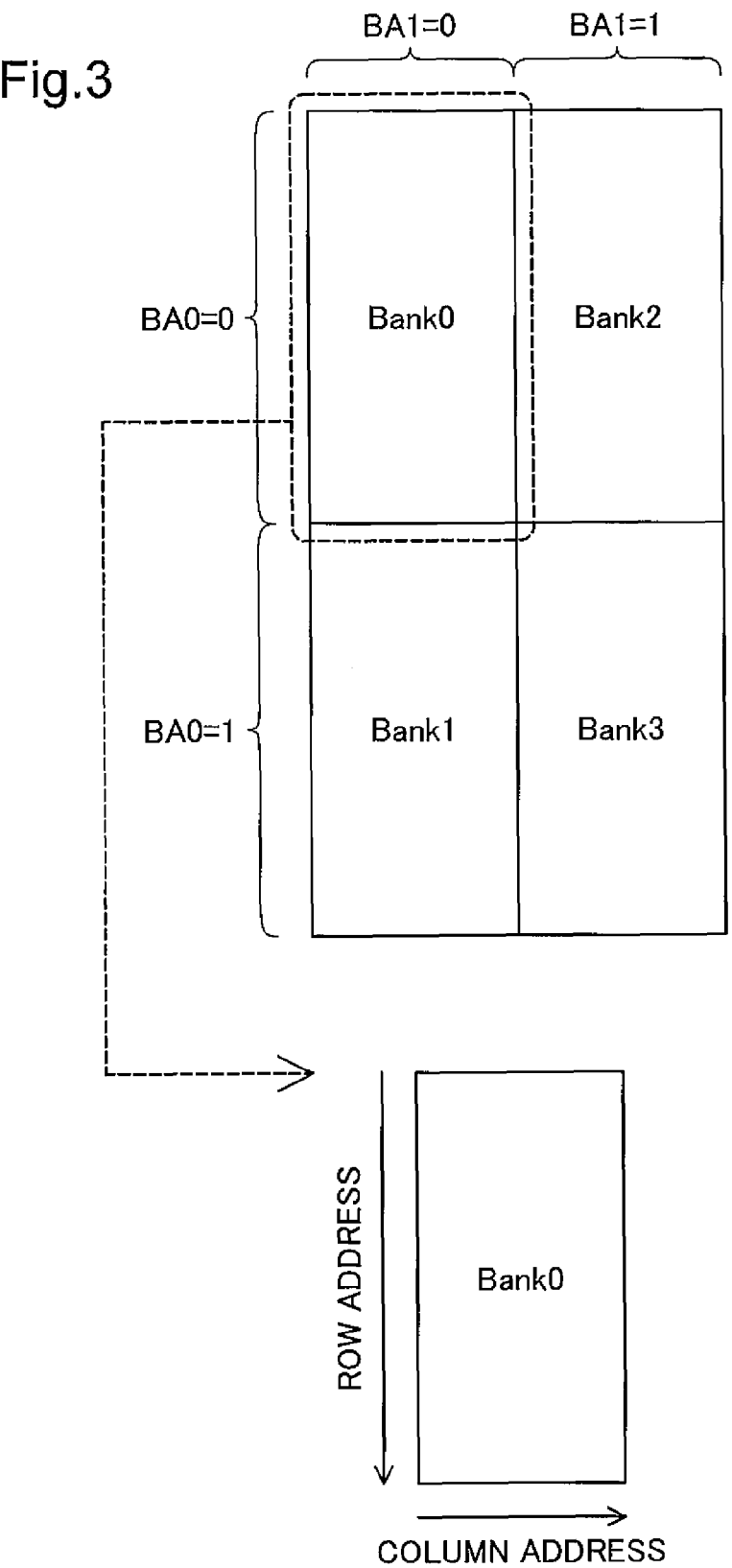
FIG. 3 depicts a bank configuration of a 512 megabit (64 megaword×8 bit) DDR2 SDRAM.

FIG. 3 depicts a bank configuration of a 512 megabit (64 megaword×8 bit) DDR2 SDRAM. As shown, the SDRAM is divided internally into four banks (Bank0 to Bank3). Each bank is provided with a row decoder, a column decoder, sense amps, etc. (not shown) so that the banks may operate independently. Using two-bit bank address BA0, BA1 inputs, the memory controller 12 will identify from among the four banks a bank containing a memory cell targeted for access; and then using the row address and the column address, will identify a particular memory cell within the identified bank.

Figure 4:
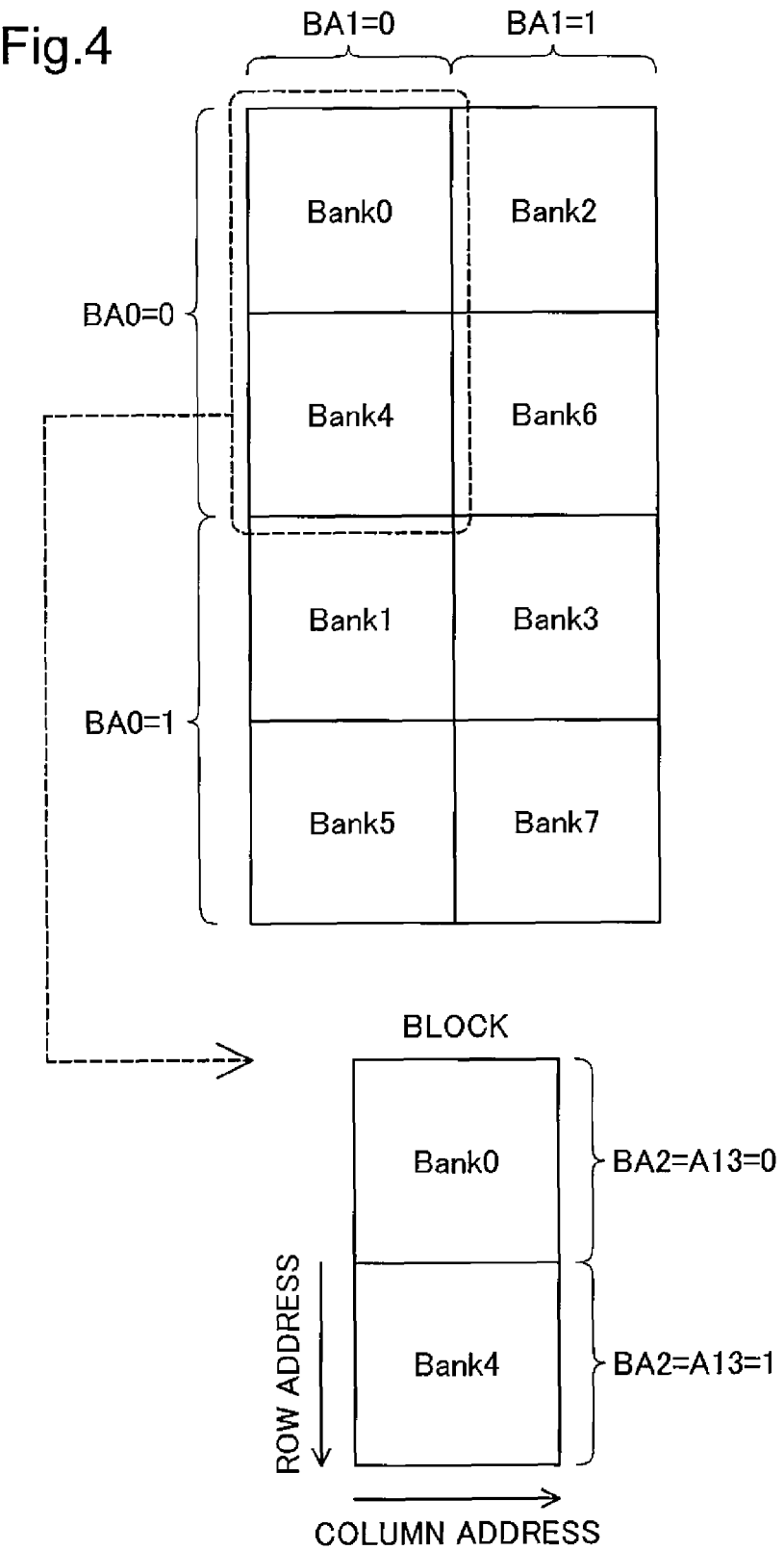
FIG. 4 depicts a bank configuration of a 1 gigabit (64 megaword×16 bit) DDR2 SDRAM.

FIG. 4 depicts a bank configuration of a 1 gigabit (64 megaword×16 bit) DDR2 SDRAM (SDRAM 110 in the memory module 100). As shown, the SDRAM 110 is divided internally into eight banks (Bank0 to Bank7). Each bank is provided with a row decoder, a column decoder, sense amps, etc. (not shown) so that the banks may operate independently. In the event that the SDRAM 110 having this configuration has been connected directly to the memory controller 12, because as discussed earlier the number of bits of addresses output by the memory controller 12 do not match the number of bits of addresses used for identification of memory cells targeted for access, the memory controller 12 will not be able to operate the SDRAM 110 normally. According to the present embodiment on the other hand (See FIG. 2), as the memory module 100 has been provided with the address generating circuit 120 described previously, the memory controller 12 will be able to access the SDRAM 110 of the memory module 100 (See FIG. 4) in the same way as if it were connected to a memory module having 512 megabit (64 megaword×8 bit) DDR2 SDRAM internally divided into four banks as shown in FIG. 3.

That is, according to the present embodiment, the memory controller 12 will be able to handle four blocks inside the SDRAM 110, i.e. a block composed of Bank0 and Bank4, a block composed of Bank1 and Bank5, a block composed of Bank2 and Bank6, and a block composed of Bank3 and Bank7, as if these were four banks. For example, if the bank address BA0, BA1 inputs that have been output by the memory controller 12 are BA0=0 and BA1=0 respectively, the memory controller 12 will be able to handle the block composed of Bank0 and Bank4 as if it were a single bank. Meanwhile, on the SDRAM 110 side, a block will be identified by the bank address B0, B1 inputs that have been output by the memory controller 12, and then either one of the banks in that block will be identified by the bank address BA2 that was output by the address generating circuit 120 (i.e. the highest order bit of the row address that was output by the memory controller 12).

Figure 5:
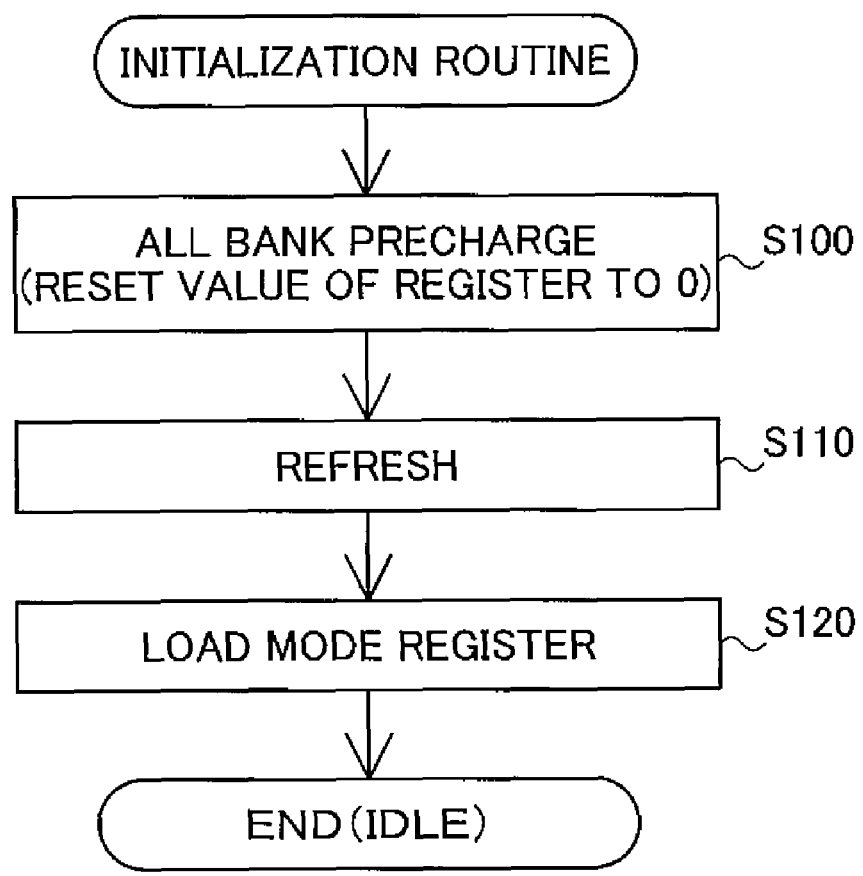
FIG. 5 is a flowchart depicting the flow of an initialization routine in the memory module 100.

FIG. 5 is a flowchart depicting the flow of an initialization routine in the memory module 100. This initialization routine is executed each time that the memory module 100 is powered on. The discussion here assumes that the memory module 100 has been connected to the memory controller 12.

First, when an "all bank precharge" command is issued by the memory controller 12, the SDRAM 110 will perform precharging of all banks (Step S100). At this time, the value in the register 122 provided to the address generating circuit 120 will be reset to zero according to the command (corresponding to the "all bank precharge" command) input from the command parser 126 (See FIG. 2). Next, when a "refresh" command is issued by the memory controller 12, the SDRAM 110 will perform a refresh operation (Step S110). Next, when a "load mode register" command is issued by the memory controller 12, the SDRAM 110 will perform switching of the operating mode in accordance with an input address bit sequence (Step S120). At this time the output selector 124 provided to the address generating circuit 120 will output the value of the register (zero) as BA2 to the SDRAM 110 according to the command (corresponding to the "load mode register" command) input from the command parser 126. Through the above operation, the initialization routine will be completed and the SDRAM 110 will assume the idle state.

Figure 6:
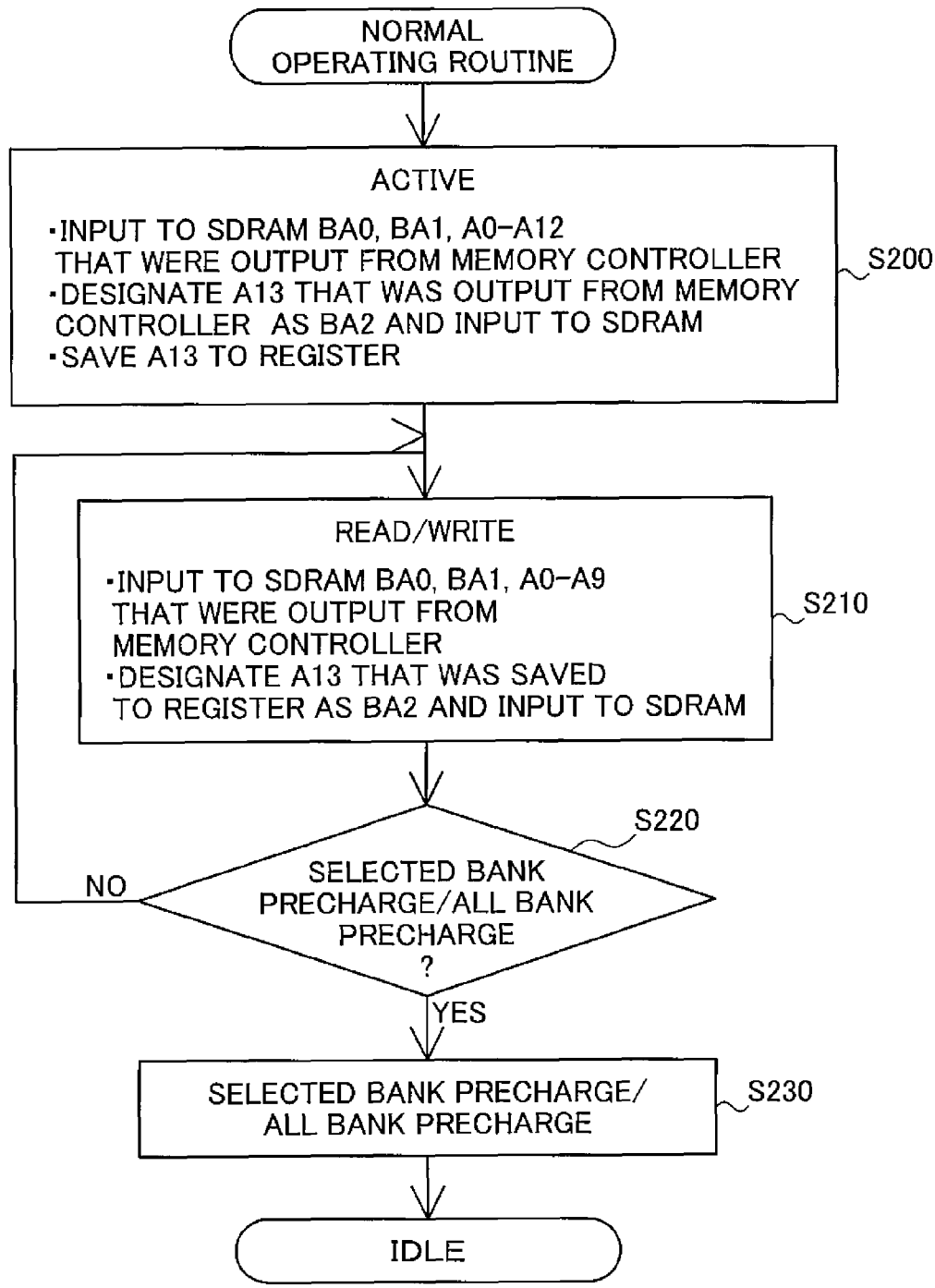
FIG. 6 is a flowchart depicting an example of the flow of a normal operating routine in the memory module 100.

FIG. 6 is a flowchart depicting an example of the flow of a normal operating routine in the memory module 100. This operating routine is executed after the initialization routine (See FIG. 5) described above has been completed. Here, a normal operating routine that takes place when the memory module 100 is connected to the memory controller 12 will be described (See FIG. 2).

First, when an "active" command is issued by the memory controller 12, the SDRAM 110 will perform activation on the basis of the bank address BA0, BA1 and row address A0-A12 inputs that were output by the memory controller 12, as well as the bank address BA2 that was output by the output selector 124 provided to the address generating circuit 120 (i.e. the highest order bit A13 of the row address that was output by the memory controller 12) (Step S200). At this time, according to the command (corresponding to the "active" command) input from the command parser 126, the highest order bit A13 of the row address that was output by the memory controller 12 will be saved in the register 122 that is provided to the address generating circuit 120. After this incident, the bit read from the register 122 by the output selector 124 is the highest order bit A13 of the row address that was output by the memory controller 12 at the time when the "active" command was issued.

Next, when the memory controller 12 issues a "read" command or a "write" command, on the basis of the bank address BA0, BA1 and column address A0-A9 inputs that were output by the memory controller 12, as well as the bank address BA2 that was output by the output selector 124 provided to the address generating circuit 120 (i.e. the highest order bit A13 of the row address that was saved to the register 122), the SDRAM 110 will either perform a read of data from the memory cell identified as the access target, or perform a write of data to the memory cell identified as the access target (Step S210).

Next, when a "selected bank precharge" command is issued by the memory controller 12 (Step S220: YES), the SDRAM 110 will perform precharging of the selected bank on the basis of the bank address BA0, BA1 that was output by the memory controller 12, as well as the bank address BA2 that was output by the output selector 124 provided to the address generating circuit 120 (i.e. the highest order bit A13 of the row address that was saved to the register 122). If the memory controller 12 instead issues an "all bank precharge" command (Step S220: YES), the SDRAM 110 will perform precharging of all banks (Step S230). At this time, the value in the register 122 provided to the address generating circuit 120 will be reset to zero according to the command (corresponding to the "all bank precharge" command) input from the command parser 126. Once the operation of Step S230 is completed, the SDRAM 110 will assume the idle state.

Subsequent to Step S210, in the event that the memory controller 12 has issued a "read" command or a "write" command (Step S220: NO), the routine will return to Step S210.

With the memory module 100 according to Embodiment 1 described above, when the sum (26 bits) of the number of bits of the bank address (2 bits), the number of bits of the row address (14 bits), and the number of bits of the column address (10 bits) that are output by the memory controller 12 is equal to the sum (26 bits) of the number of bits of the bank address (3 bits), the number of bits of the row address (13 bits), and the number of bits of the column address (10 bits) that are utilized for identification of memory cells targeted for access; the number of bits of the row address that is output by the memory controller 12 exceeds by one the number of bits of the row address that is utilized for identification of memory cells targeted for access; and additionally the number of bits of the bank address that is output by the memory controller 12 is less by one than the number of bits of the bank address that is utilized for identification of memory cells targeted for access, the highest order bit BA2 of the bank address insufficient for the purpose of identification of memory cells targeted for access can be generated by the address generating circuit 120, and the highest order bit BA2 of the bank address so generated can then be output to the SDRAM 110. Consequently, even in instances where the numbers of bits of addresses that are output by the memory controller do not respectively match the numbers of bits of addresses utilized for identification of memory cells targeted for access, under the above conditions, it will be possible to access all of the memory cells of the memory module 100 from the memory controller, and to carry out normal operation of the memory module 100.

There are two operating modes by which the SDRAM 110 provided to the memory module 100 is accessed by the memory controller 12, namely, 1T operation and 2T operation.

Figure 7A:
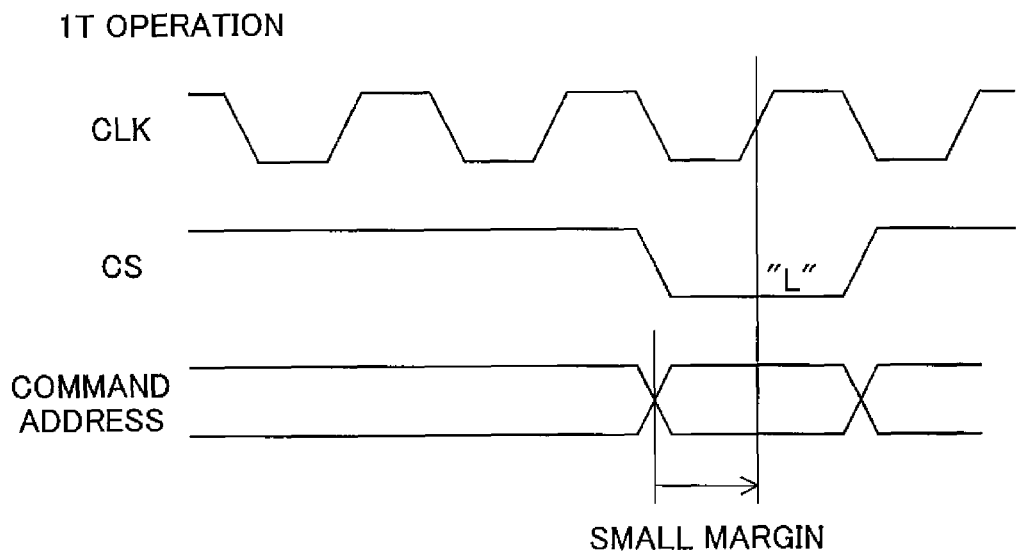
FIG. 7A depicts 1T operation.
Figure 7B:
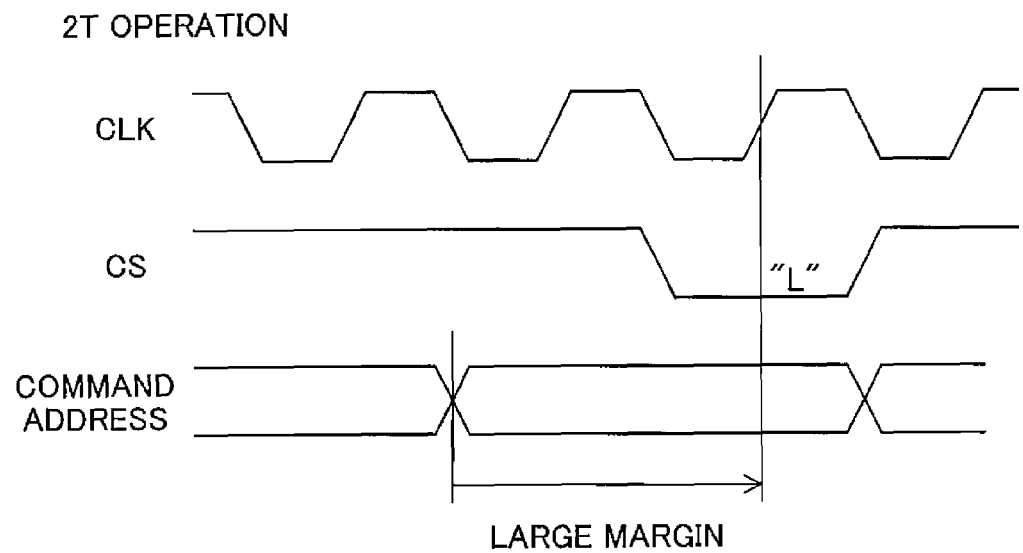
FIG. 7B depicts 2T operation.

FIGS. 7A and 7B depict 1T operation and 2T operation respectively. 1T operation in FIG. 7A is an operating mode in which the command address (RAS, CAS, WE) may change at one-cycle intervals of the clock signal (CLK), and as such represents an operating mode enabling relatively high speed access. In this 1T operation, the margin from the timing of switching to the timing of determination of the command address is relatively small, and thus the operation will be possible only when only a single memory module has been installed in a given memory channel.

2T operation in FIG. 7B, on the other hand, is an operating mode in which the command address may change at two-cycle intervals of the clock signal (CLK), and as such represents an operating mode of relatively slow access. In this 2T operation, the margin from the timing of switching to the timing of determination of the command address is relatively large, and thus the operation will be possible even when several memory modules have been installed in a given memory channel.

With the memory module 100 of the present embodiment, while it is possible for the address generating circuit 120 to generate the highest order bit BA2 of the previously discussed insufficient bank address and to output this address to the SDRAM 110, this operation of the address generating circuit 120 requires a prescribed time interval. Consequently, in the event that the operating mode of the memory controllers 10, 12 is the 1T operation and the memory module 100 control mode is in virtual mode, instances will arise in which generation and output of the highest order bit BA2 of an insufficient bank address may not take place fast enough for access to the SDRAM 110 to take place in normal fashion.

In a PC (personal computer) with an installed memory controller that does not permit concomitant connection of memory module 100 having 1-gigabit SDRAM and memory module having 512-megabit SDRAM, with connecting the memory module 100 having 1-gigabit SDRAM and memory module having 512-megabit SDRAM, the memory module with 512-megabit SDRAM is not recognized, when the control mode of the memory module 100 is in normal mode. However, the access to 1-gigabit SDRAM takes place in normal fashion. Thus, according to the present embodiment, the operation of the memory module 100, i.e. the control mode of the memory module 100, is designed to be switched appropriately in various scenarios.

FIG. 8 depicts operating conditions of the memory module 100 in various cases. The term "Mixed installation-compatible PC" appearing in the "Environment" field in the top row of the drawing indicates a PC (personal computer) with an installed a memory controller that permits concomitant connection of memory modules having 1-gigabit SDRAM and memory modules having 512-megabit SDRAM. For "Mixed installation-compatible PC", the operation of the address generating circuit 120 in which the highest order bit A13 of the row address by the memory controller 12 is output to the SDRAM 110 as the highest order bit BA2 of a bank address, i.e. the operation in the virtual mode, is not required for the normal operation.

The term "Mixed installation-incompatible PC" in the "Environment" field in the top row of the drawing indicates a PC (personal computer) with an installed memory controller that does not permit concomitant connection of memory modules having 1-gigabit SDRAM and memory modules having 512-megabit SDRAM. In "Mixed installation-incompatible PC", without the operation of the address generating circuit 120 in the virtual mode, the memory modules having 512-megabit SDRAM is not recognized from among the memory modules having 1-gigabit SDRAM and memory modules having 512-megabit SDRAM which are installed in the "Mixed installation-incompatible PC".

Case 1

In the case of concomitant installation of the memory module 100 and a memory module furnished with 512-megabit SDRAM in a "mixed installation-compatible PC" in which the operating mode of the memory controller is 1T operation (Case 1), the memory module 100 will operate normally if the control mode is in normal mode. However, as described earlier if the control mode of the memory module 100 is in virtual mode, operation of the address generating circuit 120 will not be fast enough, resulting in abnormal operation (hanging etc.). Consequently, in Case 1, it will be necessary for the control mode of the memory module 100 to be set to normal mode.

Case 2

In the case of concomitant installation of the memory module 100 and a memory module furnished with 512-megabit SDRAM in a "mixed installation-compatible PC" in which the operating mode of the memory controller is 2T operation (Case 2), the memory module 100 will operate normally both when the control mode is in normal mode and when in virtual mode.

Case 3

In the case of concomitant installation of the memory module 100 and a memory module furnished with 512-megabit SDRAM in a "mixed installation-incompatible PC" in which the operating mode of the memory controller is 1T operation (Case 3), the PC will operate normally as long as the control mode of the memory module is in normal mode, but with the problem that it will not recognize the memory module that is furnished with 512-megabit SDRAM. As described earlier if the control mode of the memory module 100 is in virtual mode, operation of the address generating circuit 120 will not be fast enough, resulting in abnormal operation (hanging etc.). Consequently, in Case 3, it will be necessary for the control mode of the memory module 100 to be set to normal mode.

Case 4

In the case of concomitant installation of the memory module 100 and a memory module furnished with 512-megabit SDRAM in a "mixed installation-incompatible PC" in which the operating mode of the memory controller is 2T operation (Case 4), the PC will operate normally as long as the control mode of the memory module is in normal mode, but with the problem that it will not recognize the memory module that is furnished with 512-megabit SDRAM, just as Case 3. On the other hand, it will operate normally if the control mode 100 of the memory module 100 is in virtual mode. Consequently, in Case 4, it will be necessary for the control mode of the memory module 100 to be set to virtual mode.

As will be appreciated from the above, regardless of whether a PC having the memory module 100 installed concomitantly with a memory module furnished with 512-megabit SDRAM is a "mixed installation-compatible PC" or a "mixed installation-incompatible PC," normal operation will be possible in all cases as long as the memory module 100 control mode is in normal mode when the memory controller operating mode is 1T operation, and the memory module 100 control mode is in virtual mode when the memory controller operating mode is 2T operation.

Figure 9:
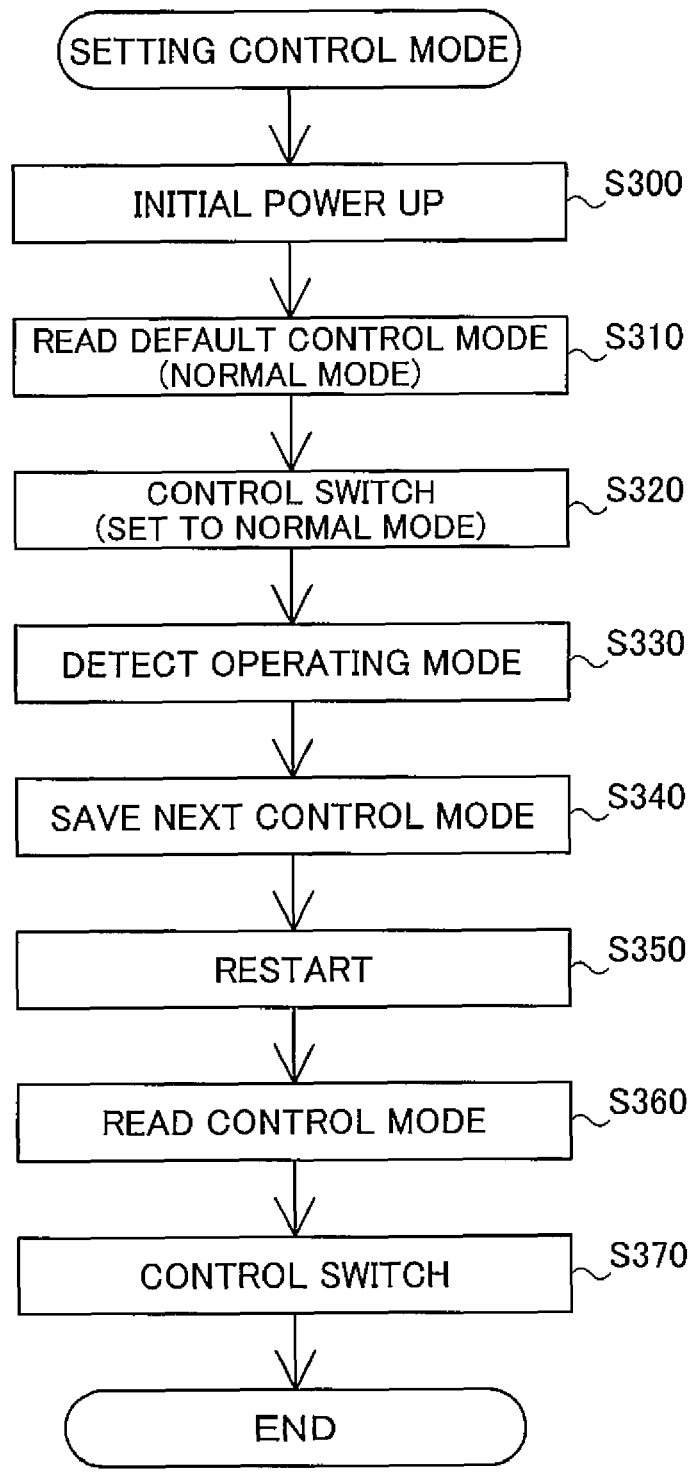
FIG. 9 is a flowchart depicting the flow of setting the control mode of the memory module 100 on the basis of the operating mode (1T operation/2T operation) of the memory controller.

FIG. 9 is a flowchart depicting the flow of setting the control mode of the memory module 100 on the basis of the operating mode (1T operation/2T operation) of the memory controller.

First, when the power is initially turned on after the memory module 100 has been installed in the computer (Step S300), the switch controller 140 will read out the default control mode (namely, normal mode) that was saved beforehand in the EEPROM 150 (Step S310), and will control the switch 128 on the basis of the default control mode (Step S320). Specifically, the control mode of the memory module 100 will be set to normal mode. The reason for setting the normal mode as the default control mode is that, as discussed earlier, when the memory controller is in 1T operation, if the control mode of the memory module 100 is in virtual mode, abnormal operation such as hanging will occur; whereas if set to normal mode, the PC can operate without risk of hanging or the like (See FIG. 8).

Next, the operating mode of the memory controller will be detected by the operating mode detector 130 (Step S330).

Figure 10A:
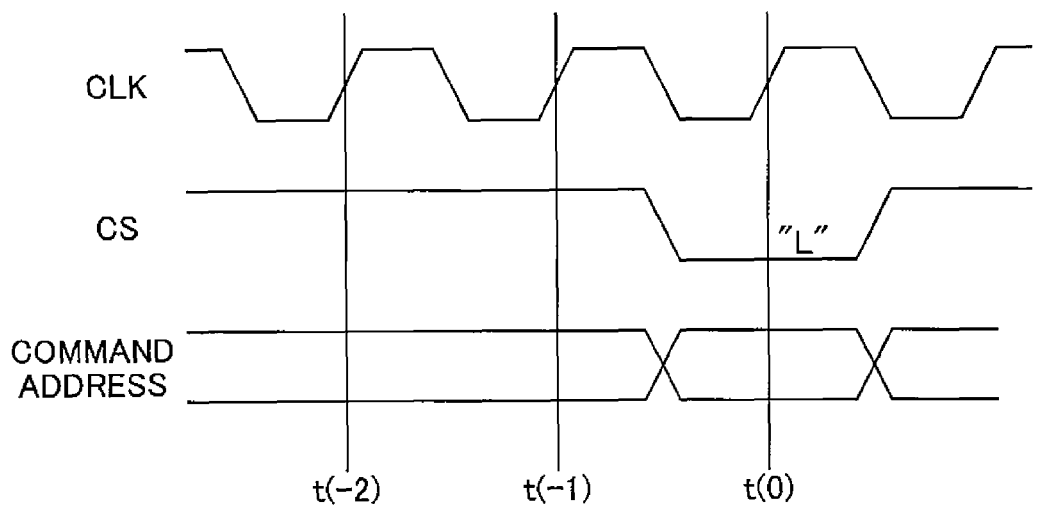
FIG. 10A depicts a method of detecting the operating mode of the memory controller.
Figure 10B:
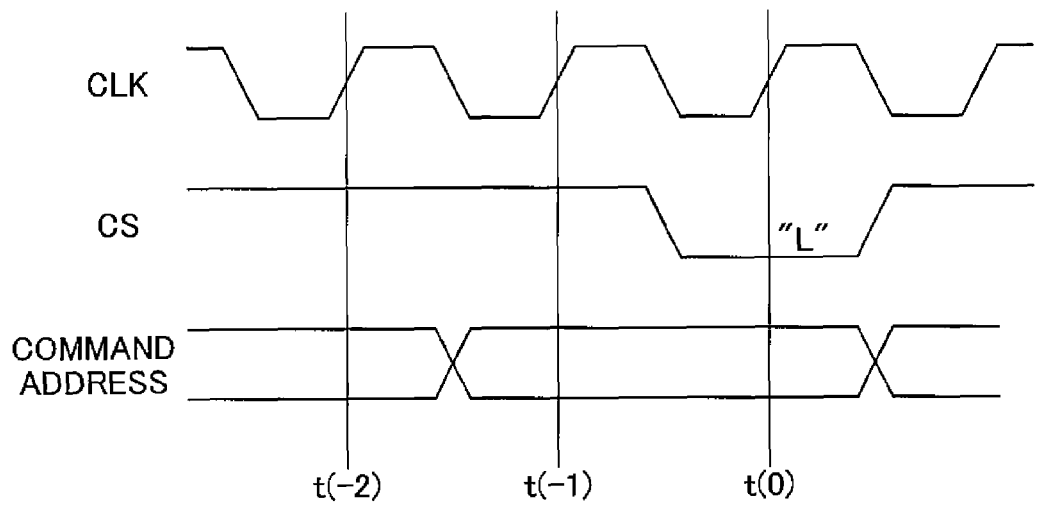
FIG. 10B depicts a method of detecting the operating mode of the memory controller.

FIGS. 10A and 10B depict a method of detecting the operating mode of the memory controller. In the present embodiment, at each rising edge of the clock signal (CLK), the operating mode detector 130 will acquire the chip select signal (CS) and command addresses (RAS, CAS, WE) in sequential fashion, holding the command addresses over three cycles and sequentially comparing them for the purpose of detecting the operating mode of the memory controller.

Specifically, as depicted in FIG. 10A, in the event that the command address acquired at time t(0) at which the acquired chip select signal (CS) is "L" differs from the command address that was acquired at the previous time t(−1), the operating mode detector 130 will make a determination that the operating mode of the memory controller is 1T operation. Meanwhile, as depicted in FIG. 10B, in the event that the command address acquired at time t(0) at which the acquired chip select signal (CS) is "L" is the same as the command address that was acquired at the previous time t(−1), and moreover the command address that was acquired at the previous time t(−1) is different from the command address that was acquired at the time t(−2) before that, the operating mode detector 130 will make a determination that the operating mode of the memory controller is 2T operation.

According to the present embodiment, the operating mode detector 130 will perform the above command address acquisition and mode determination multiple times; and if the number of times that any given operating mode is detected is equal to or greater than a prescribed number that is greater than half the total number of times (e.g. three or more times out of five), will determine the operating mode that was detected the prescribed number of times or more to be the operating mode of the memory controller. Determination of the operating mode of the memory controller can be carried out with good accuracy thereby.

Returning to FIG. 9, setting of the control mode of the memory module 100 will be described. When the operating mode of the memory controller is detected (determined) in Step S330, on the basis of the detected operating mode, the switch controller 140 will save the next control mode to the EEPROM 150 (Step S340). In the event that the detected operating mode is the 1T operation, the control mode the switch controller 140 will select the normal mode, which corresponds to the 1T operation, as the next control mode and will save it to the EEPROM 150 (see FIG. 8). If on the other hand the detected operating mode is the 2T operation, the switch controller 140 will select the virtual mode, which corresponds to the 2T operation, as the next control mode and will save it (see FIG. 8).

When the computer is subsequently restarted by the user (Step S350), the switch controller 140 will read out from the EEPROM 150 the control mode that was saved therein as the next control mode (Step S360), and will control the switch 128 on the basis of the control mode that was read out (Step S370).

According to the memory module 100 of to Embodiment 1 described above, without the user needing to decide whether to switch the switch 128, the operating mode of the memory controller can be detected as being either 1T operation or 2T operation; and the switch 128, that is, the control mode of the memory module 100, can be switched appropriately in accordance with the operating mode so detected.

B. Embodiment 2

Figure 11:
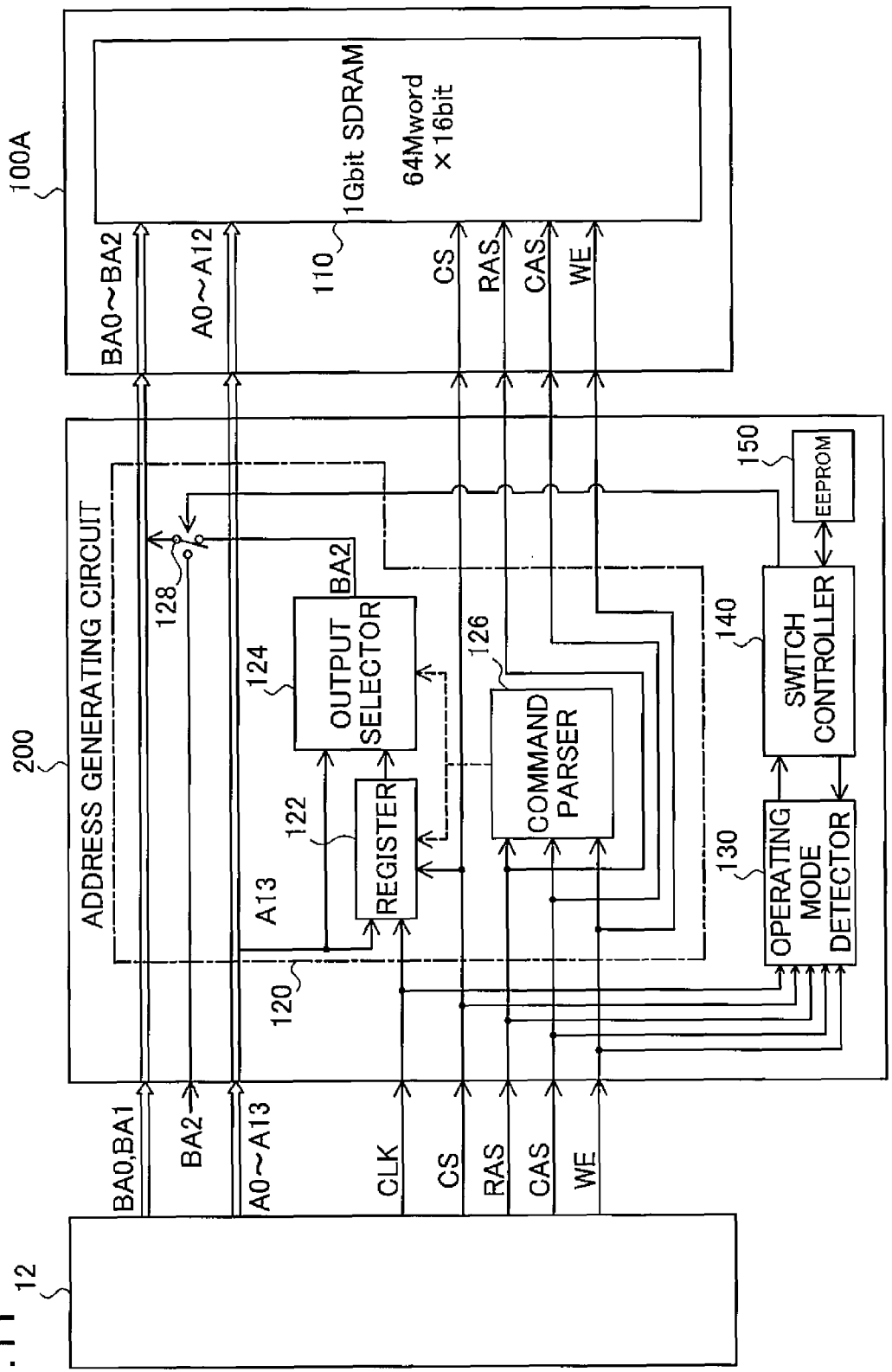
FIG. 11 depicts a general configuration of an auxiliary module 200 according to a second embodiment of the invention.

FIG. 11 depicts a general configuration of an auxiliary module 200 for memory according to a second embodiment of the invention.

As shown, this auxiliary module 200 is connected to the memory controller 12 and to a memory module 100A, when the user intends to operate the SDRAM 110 of the memory module 100A with the memory controller 12 which is not compatible with the SDRAM 110. The auxiliary module 200 relay signal and data exchanges between the memory controller 12 and the memory module 100A nevertheless. The memory module 100A is equivalent to the memory module 100 of Embodiment 1, but with the address generating circuit 120, the operating mode detector 130, the switch controller 140, and the EEPROM 150 omitted. The auxiliary module 200 serves as an adapter that is equipped with the address generating circuit 120, the operating mode detector 130, the switch controller 140, and the EEPROM 150 which in Embodiment 1 were provided to the memory module 100.

In Embodiment 2, operation of the address generating circuit 120, the operating mode detector 130, the switch controller 140, and the EEPROM 150 which are provided to the auxiliary module 200 is identical to that in the memory module 100 of Embodiment 1. Accordingly, a description of operation thereof in the present embodiment is omitted to facilitate understanding of the technology.

With the auxiliary module 200 according to Embodiment 2 described above, when the sum (26 bits) of the number of bits of the bank address (2 bits), the number of bits of the row address (14 bits), and the number of bits of the column address (10 bits) that are output by the memory controller 12 is equal to the sum (26 bits) of the number of bits of the bank address (3 bits), the number of bits of the row address (13 bits), and the number of bits of the column address (10 bits) that are utilized for identification of memory cells targeted for access; the number of bits of the row address that is output by the memory controller 12 exceeds by one the number of bits of the row address that is utilized for identification of memory cells targeted for access; and additionally the number of bits of the bank address that is output by the memory controller 12 is less by one than the number of bits of the bank address that is utilized for identification of memory cells targeted for access, the highest order bit BA2 of the bank address insufficient for the purpose of identification of memory cells targeted for access can be generated by the address generating circuit 120, and the highest order bit BA2 of the bank address so generated can then be output to the memory module 100A. Consequently, even in instances where the numbers of bits of addresses that are output by the memory controller do not respectively match the numbers of bits of addresses utilized for identification of memory cells targeted for access, under the above conditions, it will be possible to access all of the memory cells of the memory module 100A from the memory controller, and to carry out normal operation of the memory module 100A.

Like the memory module 100 of Embodiment 1, according to the auxiliary module 200 of Embodiment 2, the operating mode of the memory controller can be detected as being either 1T operation or 2T operation; and the switch 128, that is, the control mode of the auxiliary module 200, can be switched appropriately in accordance with the operating mode so detected, without the user needing to decide whether to switch the switch 128.

C. Modified Embodiments

While the present invention has been shown above through certain preferred embodiments, the invention is in no way limited to these embodiments and without departing from the spirit of the invention may be reduced to practice in various other modes. Possible modifications could include the following, for example.

C1. Modified Embodiment 1

The preceding embodiments described a situation in which (i) the sum of the number of bits of the bank address, the number of bits of the row address, and the number of bits of the column address that are output by the memory controller is equal to the sum of the number of bits of the bank address, the number of bits of the row address, and the number of bits of the column address that are utilized for identification of memory cells targeted for access; (ii) the number of bits of the row address that is output by the memory controller exceeds by one the number of bits of the row address that is utilized for identification of memory cells targeted for access; and additionally (iii) the number of bits of the bank address that is output by the memory controller is less by one than the number of bits of the bank address that is utilized for identification of memory cells targeted for access; however, the invention is not limited to this situation.

While not illustrated or described in any detail herein, as would be understood by one skilled in the art, the invention would also be applicable in a situation in which (i) the sum of the number of bits of the bank address, the number of bits of the row address, and the number of bits of the column address that are output by the memory controller is equal to the sum of the number of bits of the bank address, the number of bits of the row address, and the number of bits of the column address that are utilized for identification of memory cells targeted for access; (ii) the number of bits of the row address that is output by the memory controller exceeds by one the number of bits of the row address that is utilized for identification of memory cells targeted for access; and additionally (iii) the number of bits of the column address that is output by the memory controller is less by one than the number of bits of the column address that is utilized for identification of memory cells targeted for access. In this case, it will be acceptable for the address generating circuit, using the highest order bit of the row address output by the memory controller, to generate the highest order bit of the column address that is insufficient for the purpose of identification of the memory cell targeted for access; and to then output the generated highest order bit of the column address to the SDRAM. Through this approach, as in the preceding embodiments, it will be possible thereby to access all of the memory cells of the memory module from the memory controller, and to carry out normal operation of the memory module, even in instances where the numbers of bits of addresses that are output by the memory controller do not respectively match the numbers of bits of addresses utilized for identification of memory cells targeted for access.

C2. Modified Embodiment 2

In the preceding embodiments, the switch 128 is disposed downstream from the output selector 124 in the address generating circuit 120; however, the invention is not limited to this design. It is sufficient merely for the address generating circuit 120, using the highest order bit of the row address output by the memory controller, to be able to generate the highest order bit of a band address for use in identification of the memory cell targeted for access, and to output the bit to the SDRAM; so the switch 128 may be disposed in a different location instead.

C3. Modified Embodiment 3

In the memory module 100 of the preceding embodiments, DDR2 SDRAM is employed as the SDRAM 110; however, no particular limitation of the invention is imposed thereby. In place of DDR2 SDRAM it would be possible to use, for example, other SDRAM having multiple banks, such as DDR SDRAM or DDR3 SDRAM.

C4. Other Aspects

Aspect 1
  A memory module comprising:
    memory that has a plurality of banks containing a plurality of memory cells arranged in a matrix array, wherein each of the memory cells that is targeted for access is identified on the basis of a bank address composed of a prescribed number of bits, a row address composed of a prescribed number of bits, and a column address composed of a prescribed number of bits, the addresses being input from a memory controller;
    an address generator configured to be able to generate a highest order bit of a bank address to be utilized for identification of the memory cell targeted for access, using a highest order bit of a row address that is output by the memory controller, and to be able to output the highest order bit of the bank address to the memory, in case where
      (i) a sum of a number of bits of the bank address, a number of bits of the row address, and a number of bits of the column address that have been output by the memory controller is equal to a sum of the number of bits of the bank address, the number of bits of the row address, and the number of bits of the column address that are utilized for identification of the memory cell targeted for access;
      (ii) the number of bits of the row address that is output by the memory controller exceeds by one the number of bits of the row address that is utilized for identification of the memory cell targeted for access; and
      (iii) the number of bits of the bank address that is output by the memory controller is less by one than the number of bits of the bank address that is utilized for identification of the memory cell targeted for access;
    an operating mode detector configured to detect an operating mode of access to the memory by the memory controller; and
    an address generating controller configured to control the address generator based on the operating mode detected by the operating mode detector.

According to the memory module of aspect 1, when (i) the sum of the number of bits of the bank address, the number of bits of the row address, and the number of bits of the column address that are output by the memory controller is equal to the sum of the number of bits of the bank address, the number of bits of the row address, and the number of bits of the column address that are utilized for identification of a memory cell targeted for access; additionally, (ii) the number of bits of the row address that is output by the memory controller exceeds by one the number of bits of the row address that is utilized for identification of the memory cell targeted for access; and additionally (iii) the number of bits of the bank address that is output by the memory controller is less by one than the number of bits of the bank address that is utilized for identification of the memory cell targeted for access, a highest order bit of the bank address insufficient for the purpose of identification of the memory cell targeted for access can be generated by the address generator, and the highest order bit of the bank address so generated then output to the memory. Consequently, even in instances where the numbers of bits of the addresses that are output by the memory controller do not respectively match the numbers of bits of the addresses utilized for identification of memory cells targeted for access, under the above conditions, it will be possible to access all of the memory cells of the memory module from the memory controller, and to carry out normal operation of the memory module.

Generation and output of a highest order bit of the bank address by the address generator requires a prescribed time interval, and in the event that the operating mode of access to the memory by the memory controller happens to be an operating mode enabling access at relatively high speed, instances may arise in which generation and output of a highest order bit for the bank address cannot take place fast enough for access to the memory by the memory controller to be carried out in normal fashion. For this reason, it is preferable to control the address generator, i.e. to switch the control mode of the address generator, so that in the event that the operating mode of access to the memory by the memory controller is an operating mode in which access at relatively high speed is enabled, the address generator will not carry out this process of generating and outputting a highest order bit for the bank address. Herein, "control of the address generator" may include switching whether the aforementioned generation process is carried out, and/or whether the aforementioned the aforementioned output process is carried out.

Because the memory module according to aspect 1 is furnished with the aforementioned operating mode detector and controller, the aforementioned switching operation can take place according to whether the current operating mode of access to the memory by the memory controller is a first operating mode or a second operating mode, without the user having to decide if it is necessary to switch the control mode of the address generator.

Aspect 2

The memory module according to aspect 1 wherein the memory controller includes as the operating mode of access to the memory:

a first operating mode in which commands issued by the memory controller may change at one-cycle intervals of a clock signal that is output by the memory controller;

a second operating mode in which the commands do not change at one-cycle intervals but may change at two-cycle intervals of the clock signal; and the address generating controller controls the address generator such that when the operating mode detected by the operating mode detector is the first operating mode, the output of the highest order bit of the bank address to the memory is prohibited; and when the operating mode detected by the operating mode detector is the second operating mode, the highest order bit of the bank address is output to the memory.

Aspect 3

The memory module according to aspect 1 wherein the address generator includes:

a register configured to temporarily store the highest order bit of the row address output by the memory controller;

an output selector configured to select either the highest order bit of the row address output by the memory controller, or the highest order bit of the row address stored in the register, for output to the memory as the highest order bit of the bank address to be utilized for identification of the memory cell targeted for access; and a command parser configured to parse command that specifies an access method to the memory based on row address strobe signal, column address strobe signal, and write enable signal output by the memory controller; and to output the parsed command to the register and to the output selector; wherein based on the command input from the command parser, the register stores the highest order bit of the row address and resets the highest order bit; and based on the command input from the command parser, the output selector outputs either the highest order bit of the row address output by the memory controller, or the highest order bit of the row address stored in the register.

The following aspect is also preferable. In the aspect, when the command input from the command parser is an active command, the register stores the highest order bit of the row address. When the command input from the command parser is an all bank precharge command, the register resets the highest order bit. When the command input from the command parser is the active command, the output selector outputs the highest order bit of the row address output by the memory controller. When the command input from the command parser is not the active command, the output selector outputs the highest order bit of the row address stored in the register.

Aspect 4

A memory module comprising:

memory that has a plurality of banks containing a plurality of memory cells arranged in a matrix array, wherein each of the memory cells that is targeted for access is identified on the basis of a bank address composed of a prescribed number of bits, a row address composed of a prescribed number of bits, and a column address composed of a prescribed number of bits, the addresses being input from a memory controller;

an address generator configured to be able to generate a highest order bit of a column address to be utilized for identification of the memory cell targeted for access, using a highest order bit of a row address that is output by the memory controller, and to be able to output the highest order bit of the column address to the memory, in case where (i) a sum of a number of bits of the bank address, a number of bits of the row address, and a number of bits of the column address that have been output by the memory controller is equal to a sum of the number of bits of the bank address, the number of bits of the row address, and the number of bits of the column address that are utilized for identification of the memory cell targeted for access;

(ii) the number of bits of the row address that is output by the memory controller exceeds by one the number of bits of the row address that is utilized for identification of the memory cell targeted for access; and (iii) the number of bits of the column address that is output by the memory controller is less by one than the number of bits of the column address that is utilized for identification of the memory cell targeted for access;

an operating mode detector configured to detect an operating mode of access to the memory by the memory controller; and an address generating controller configured to control the address generator based on the operating mode detected by the operating mode detector.

According to the memory module of aspect 4, when (i) the sum of the number of bits of the bank address, the number of bits of the row address, and the number of bits of the column address that are output by the memory controller is equal to the sum of the number of bits of the bank address, the number of bits of the row address, and the number of bits of the column address that are utilized for identification of a memory cell targeted for access; (ii) the number of bits of the row address that is output by the memory controller exceeds by one bit the number of bits of the row address that is utilized for identification of the memory cell targeted for access; and additionally (iii) the number of bits of the column address that is output by the memory controller is less by one bit than the number of bits of the column address that is utilized for identification of the memory cell targeted for access, a highest order bit of the column address insufficient for the purpose of identification of the memory cell targeted for access can be generated by the address generator, and the highest order bit of the column address so generated then output to the memory. Consequently, even in instances where the numbers of bits of the addresses that are output by the memory controller do not respectively match the numbers of bits of the addresses utilized for identification of memory cells targeted for access, under the above conditions, it will be possible to access all of the memory cells of the memory module from the memory controller, and to carry out normal operation of the memory module.

Since generation and output of a highest order bit of the column address by the address generator requires a prescribed time interval, in the event that the operating mode of access to the memory by the memory controller happens to be an operating mode enabling access at relatively high speed, instances may arise in which generation and output of a highest order bit for the column address cannot take place fast enough for access to the memory by the memory controller to be carried out in normal fashion. For this reason, it is preferable to control the address generator, i.e. to switch the control mode of the address generator, so that in the event that the operating mode of access to the memory by the memory controller is an operating mode in which access at relatively high speed is enabled, the address generator will not carry out this process of generating and outputting a highest order bit for the column address. Herein, control of the address generator refers either to whether the aforementioned generation process is carried out, or to whether the aforementioned the aforementioned output process is carried out.

Because the memory module according to aspect 4 is furnished with the aforementioned operating mode detector and controller, the aforementioned switching operation can take place according to whether the current operating mode of access to the memory by the memory controller is a first operating mode or a second operating mode, without the user having to decide if it is necessary to switch the control mode of the address generator.

Aspect 5

The memory module according to aspect 4 wherein the memory controller includes as the operating mode of access to the memory:
a first operating mode in which commands issued by the memory controller may change at one-cycle intervals of a clock signal that is output by the memory controller;
a second operating mode in which the commands do not change at one-cycle intervals but may change at two-cycle intervals of the clock signal; and
the address generating controller controls the address generator such that
when the operating mode detected by the operating mode detector is the first operating mode, the output of the highest order bit of the column address to the memory is prohibited; and
when the operating mode detected by the operating mode detector is the second operating mode, the highest order bit of the column address is output to the memory.

Aspect 6

The memory module according to aspect 4 wherein the address generator includes:
a register configured to temporarily store the highest order bit of the row address output by the memory controller;
an output selector configured to select either the highest order bit of the row address output by the memory controller, or the highest order bit of the row address stored in the register, for output to the memory as the highest order bit of the column address to be utilized for identification of the memory cell targeted for access; and
a command parser configured to parse command that specifies an access method to the memory based on row address strobe signal, column address strobe signal, and write enable signal output by the memory controller; and to output the parsed command to the register and to the output selector; wherein
based on the command input from the command parser, the register stores the highest order bit of the row address and resets the highest order bit; and
based on the command input from the command parser, the output selector outputs either the highest order bit of the row address output by the memory controller, or the highest order bit of the row address stored in the register.

Aspect 7

The memory module according to any of aspects 1 and 4 further comprising:
nonvolatile memory adapted to save a parameter associated with the operating mode detected by the operating mode detector;
wherein the address generating controller reads out the parameter that was saved to the nonvolatile memory, and controls the address generator on the basis of the parameter.

According to the memory module of aspect 7, switching of the control mode of the address generator can take place on the basis of the aforementioned parameter that has been stored in nonvolatile memory (e.g. EEPROM (Electrically Erasable and Programmable Read Only Memory) or the like). As the parameter, it would be acceptable to use the aforementioned control mode of the address generator, or the aforementioned operating mode.

Aspect 8

The memory module according to aspect 7 wherein
when a computer is initially started up after the memory module has been installed in the computer, the address generating controller saves to the nonvolatile memory the parameter associated with the operating mode detected by the operating mode detector, and
when the computer is started up a second and subsequent times, the address generating controller reads out the parameter stored in the nonvolatile memory.

Typically, once the memory module has been installed in a computer, i.e. after it has been connected to the memory controller, the operating mode of access to the memory by the memory controller is fixed as long as there is no appreciable change in the configuration of the memory module or the memory controller in the computer.

According to the memory module of aspect 8, provided that detection of the operating mode is carried out one time after the memory module has been installed in the computer, access of the memory by the memory controller can take place normally without the need to subsequently carry out detection of the operating mode. The aforementioned nonvolatile memory will have stored therein beforehand certain default parameters that, once the memory module has been installed in the computer, will be used during initial booting of the computer, and the default parameters will be used when the computer is booted after having installed the memory module in the computer.

Aspect 9

The memory module according to any of aspects 2 and 5 wherein
the operating mode detector detects the operating mode based on a clock signal, a chip select signal, a row address strobe signal, a column address strobe signal, and a write enable signal output by the memory controller.

Aspect 10

The memory module according to aspect 9 wherein
the operating mode detector acquires the chip select signal, the row address strobe signal, the column address strobe signal, and the write enable signal, at each rising edge of the clock signal, and hold each of the signals,
the operating mode detector detects that the operating mode is the first operating mode, if at least one of the row address strobe signal, the column address strobe signal, and the write enable signal that were acquired when the acquired chip select signal is "L" is different from the previously acquired row address strobe signal, column address strobe signal, or write enable signal, and
the operating mode detector detects that the operating mode is the second operating mode, if (a) the row address strobe signal, the column address strobe signal, and the write enable signal that were acquired when the acquired chip select signal is "L" are respectively the same as the previously acquired row address strobe signal, column address strobe signal, and write enable signal; and additionally (b) at least one of the previously acquired row address strobe signal, column address strobe signal, and write enable signal is different from the row address strobe signal, the column address strobe signal, or the write enable signal that were acquired the time before.

According to the memory module of aspect 10, detection of the operating mode can be carried out relatively easily by using the clock signal, the chip select signal, the row address strobe signal, the column address strobe signal, and the write enable signal.

Aspect 11

The memory module according to aspect 10 wherein the operating mode detector performs detection of operating mode multiple times; and when a number of times that the first operating mode is detected or a number of times that the second operating mode is detected is greater than half the number of multiple times, the operating mode detector determines the operating mode that was detected the number of times greater than half the number of multiple times to be the operating mode of the memory controller.

According to the memory module of aspect 11, determination of the current operating mode can be carried out with good accuracy.

Aspect 12

An auxiliary module connected to a memory controller and to a memory module, and adapted to relay exchanges of signals and data between the memory controller and the memory module, wherein the memory module is furnished with memory that has a plurality of banks containing a plurality of memory cells arranged in a matrix array, wherein each of the memory cells that is targeted for access is identified on the basis of a bank address composed of a prescribed number of bits, a row address composed of a prescribed number of bits, and a column address composed of a prescribed number of bits, the addresses being input from the memory controller, wherein the auxiliary module comprises:

an address generator configured to be able to generate a highest order bit of a bank address to be utilized for identification of the memory cell targeted for access, using a highest order bit of a row address that is output by the memory controller, and to be able to output the highest order bit of the bank address to the memory, in case where (i) a sum of a number of bits of the bank address, a number of bits of the row address, and a number of bits of the column address that have been output by the memory controller is equal to a sum of the number of bits of the bank address, the number of bits of the row address, and the number of bits of the column address that are utilized for identification of the memory cell targeted for access;

(ii) the number of bits of the row address that is output by the memory controller exceeds by one the number of bits of the row address that is utilized for identification of the memory cell targeted for access; and (iii) the number of bits of the bank address that is output by the memory controller is less by one than the number of bits of the bank address that is utilized for identification of the memory cell targeted for access;

an operating mode detector configured to detect an operating mode of access to the memory by the memory controller; and an address generating controller configured to control the address generator based on the operating mode detected by the operating mode detector.

According to the auxiliary module of aspect 12, when (i) the sum of the number of bits of the bank address, the number of bits of the row address, and the number of bits of the column address that are output by the memory controller is equal to the sum of the number of bits of the bank address, the number of bits of the row address, and the number of bits of the column address that are utilized for identification of a memory cell targeted for access; (ii) the number of bits of the row address that is output by the memory controller exceeds by one bit the number of bits of the row address that is utilized for identification of the memory cell targeted for access; and (iii) additionally the number of bits of the bank address that is output by the memory controller is less by one bit than the number of bits of the bank address that is utilized for identification of the memory cell targeted for access, a highest order bit of the bank address insufficient for the purpose of identification of the memory cell targeted for access can be generated by the address generator, and the highest order bit of the bank address so generated then output to the memory. Consequently, even in instances where the numbers of bits of the addresses that are output by the memory controller do not respectively match the numbers of bits of the addresses utilized for identification of memory cells targeted for access, under the above conditions, it will be possible to access all of the memory cells of the memory module from the memory controller, and to carry out normal operation of the memory module. Further, the aforementioned switching operation can take place according to whether the current operating mode of access to the memory by the memory controller is a first operating mode or a second operating mode, without the user having to decide if it is necessary to switch the control mode of the address generator. Like the memory module of aspect 1 described previously, the auxiliary module of aspect 12 may incorporate the various additional elements discussed earlier.

Aspect 13

An auxiliary module connected to a memory controller and to a memory module, and adapted to relay exchanges of signals and data between the memory controller and the memory module, wherein the memory module is furnished with memory that has a plurality of banks containing a plurality of memory cells arranged in a matrix array, wherein each of the memory cells that is targeted for access is identified on the basis of a bank address composed of a prescribed number of bits, a row address composed of a prescribed number of bits, and a column address composed of a prescribed number of bits, the addresses being input from the memory controller, wherein the auxiliary module comprises:

an address generator configured to be able to generate a highest order bit of a column address to be utilized for identification of the memory cell targeted for access, using a highest order bit of a row address that is output by the memory controller, and to be able to output the highest order bit of the column address to the memory, in case where (i) a sum of a number of bits of the bank address, a number of bits of the row address, and a number of bits of the column address that have been output by the memory controller is equal to a sum of the number of bits of the bank address, the number of bits of the row address, and the number of bits of the column address that are utilized for identification of the memory cell targeted for access;

(ii) the number of bits of the row address that is output by the memory controller exceeds by one the number of bits of the row address that is utilized for identification of the memory cell targeted for access; and (iii) the number of bits of the column address that is output by the memory controller is less by one than the number of bits of the column address that is utilized for identification of the memory cell targeted for access;

an operating mode detector configured to detect an operating mode of access to the memory by the memory controller; and an address generating controller configured to control the address generator based on the operating mode detected by the operating mode detector.

According to the auxiliary module of aspect 13, when (i) the sum of the number of bits of the bank address, the number of bits of the row address, and the number of bits of the column address that are output by the memory controller is equal to the sum of the number of bits of the bank address, the number of bits of the row address, and the number of bits of the column address that are utilized for identification of a memory cell targeted for access; (ii) the number of bits of the row address that is output by the memory controller exceeds by one bit the number of bits of the row address that is utilized for identification of the memory cell targeted for access; and additionally (iii) the number of bits of the column address that is output by the memory controller is less by one bit than the number of bits of the column address that is utilized for identification of the memory cell targeted for access, a highest order bit of the column address insufficient for the purpose of identification of the memory cell targeted for access can be generated by the address generator, and the highest order bit of the column address so generated then output to the memory. Consequently, even in instances where the numbers of bits of the addresses that are output by the memory controller do not respectively match the numbers of bits of the addresses utilized for identification of memory cells targeted for access, under the above conditions, it will be possible to access all of the memory cells of the memory module from the memory controller, and to carry out normal operation of the memory module. Further, the aforementioned switching operation can take place according to whether the current operating mode of access to the memory by the memory controller is a first operating mode or a second operating mode, without the user having to decide if it is necessary to switch the control mode of the address generator. Like the memory module of aspect 4 described previously, the auxiliary module of aspect 13 may incorporate the various additional elements discussed earlier.

Still further aspects of the invention may incorporate appropriate combinations of some of the various features discussed above. For example, there could be configured a memory module that is equipped both with the address generator of the memory module of aspect 1 and the address generator of the memory module of aspect 4, selectively using the two as appropriate.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A memory module comprising:
   memory that has a plurality of banks containing a plurality of memory cells arranged in a matrix array, wherein each of the memory cells that is targeted for access is identified on the basis of a bank address composed of a prescribed number of bits, a row address composed of a prescribed number of bits, and a column address composed of a prescribed number of bits, the addresses being input from a memory controller;
   an address generator configured to be able to generate a highest order bit of a bank address to be utilized for identification of the memory cell targeted for access, using a highest order bit of a row address that is output by the memory controller, and to be able to output the highest order bit of the bank address to the memory, in case where
   (i) a sum of a number of bits of the bank address, a number of bits of the row address, and a number of bits of the column address that have been output by the memory controller is equal to a sum of the number of bits of the bank address, the number of bits of the row address, and the number of bits of the column address that are utilized for identification of the memory cell targeted for access;
   (ii) the number of bits of the row address that is output by the memory controller exceeds by one the number of bits of the row address that is utilized for identification of the memory cell targeted for access; and
   (iii) the number of bits of the bank address that is output by the memory controller is less by one than the number of bits of the bank address that is utilized for identification of the memory cell targeted for access;
   an operating mode detector configured to detect an operating mode of access to the memory by the memory controller; and
   an address generating controller configured to control the address generator based on the operating mode detected by the operating mode detector.

2. The memory module according to claim 1 wherein the memory controller includes as the operating mode of access to the memory:
   a first operating mode in which commands issued by the memory controller may change at one-cycle intervals of a clock signal that is output by the memory controller;
   a second operating mode in which the commands do not change at one-cycle intervals but may change at two-cycle intervals of the clock signal; and
   the address generating controller controls the address generator such that
   when the operating mode detected by the operating mode detector is the first operating mode, the output of the highest order bit of the bank address to the memory is prohibited; and
   when the operating mode detected by the operating mode detector is the second operating mode, the highest order bit of the bank address is output to the memory.

3. The memory module according to claim 1 wherein the address generator includes:
   a register configured to temporarily store the highest order bit of the row address output by the memory controller;
   an output selector configured to select either the highest order bit of the row address output by the memory controller, or the highest order bit of the row address stored in the register, for output to the memory as the highest order bit of the bank address to be utilized for identification of the memory cell targeted for access; and a command parser configured to parse command that specifies an access method to the memory based on row address strobe signal, column address strobe signal, and write enable signal output by the memory controller; and to output the parsed command to the register and to the output selector; wherein based on the command input from the command parser, the register stores the highest order bit of the row address and resets the highest order bit; and based on the command input from the command parser, the output selector outputs either the highest order bit of the row address output by the memory controller, or the highest order bit of the row address stored in the register.

4. The memory module according to claim 1 further comprising:

nonvolatile memory adapted to save a parameter associated with the operating mode detected by the operating mode detector;

wherein the address generating controller reads out the parameter that was saved to the nonvolatile memory, and controls the address generator on the basis of the parameter.

5. The memory module according to claim 4 wherein when a computer is initially started up after the memory module has been installed in the computer, the address generating controller saves to the nonvolatile memory the parameter associated with the operating mode detected by the operating mode detector, and when the computer is started up a second and subsequent times, the address generating controller reads out the parameter stored in the nonvolatile memory.

6. The memory module according to claim 2 wherein the operating mode detector detects the operating mode based on a clock signal, a chip select signal, a row address strobe signal, a column address strobe signal, and a write enable signal output by the memory controller.

7. The memory module according to claim 6 wherein the operating mode detector acquires the chip select signal, the row address strobe signal, the column address strobe signal, and the write enable signal, at each rising edge of the clock signal, and hold each of the signals, the operating mode detector detects that the operating mode is the first operating mode, if at least one of the row address strobe signal, the column address strobe signal, and the write enable signal that were acquired when the acquired chip select signal is "L" is different from the previously acquired row address strobe signal, column address strobe signal, or write enable signal, and the operating mode detector detects that the operating mode is the second operating mode, if (a) the row address strobe signal, the column address strobe signal, and the write enable signal that were acquired when the acquired chip select signal is "L" are respectively the same as the previously acquired row address strobe signal, column address strobe signal, and write enable signal; and additionally (b) at least one of the previously acquired row address strobe signal, column address strobe signal, and write enable signal is different from the row address strobe signal, the column address strobe signal, or the write enable signal that were acquired the time before.

8. The memory module according to claim 7 wherein the operating mode detector performs detection of operating mode multiple times; and when a number of times that the first operating mode is detected or a number of times that the second operating mode is detected is greater than half the number of multiple times, the operating mode detector determines the operating mode that was detected the number of times greater than half the number of multiple times to be the operating mode of the memory controller.

9. A memory module comprising:

memory that has a plurality of banks containing a plurality of memory cells arranged in a matrix array, wherein each of the memory cells that is targeted for access is identified on the basis of a bank address composed of a prescribed number of bits, a row address composed of a prescribed number of bits, and a column address composed of a prescribed number of bits, the addresses being input from a memory controller;

an address generator configured to be able to generate a highest order bit of a column address to be utilized for identification of the memory cell targeted for access, using a highest order bit of a row address that is output by the memory controller, and to be able to output the highest order bit of the column address to the memory, in case where (i) a sum of a number of bits of the bank address, a number of bits of the row address, and a number of bits of the column address that have been output by the memory controller is equal to a sum of the number of bits of the bank address, the number of bits of the row address, and the number of bits of the column address that are utilized for identification of the memory cell targeted for access;

(ii) the number of bits of the row address that is output by the memory controller exceeds by one the number of bits of the row address that is utilized for identification of the memory cell targeted for access; and (iii) the number of bits of the column address that is output by the memory controller is less by one than the number of bits of the column address that is utilized for identification of the memory cell targeted for access;

an operating mode detector configured to detect an operating mode of access to the memory by the memory controller; and an address generating controller configured to control the address generator based on the operating mode detected by the operating mode detector.

10. The memory module according to claim 9 wherein the memory controller includes as the operating mode of access to the memory:

a first operating mode in which commands issued by the memory controller may change at one-cycle intervals of a clock signal that is output by the memory controller;

a second operating mode in which the commands do not change at one-cycle intervals but may change at two-cycle intervals of the clock signal; and the address generating controller controls the address generator such that when the operating mode detected by the operating mode detector is the first operating mode, the output of the highest order bit of the column address to the memory is prohibited; and when the operating mode detected by the operating mode detector is the second operating mode, the highest order bit of the column address is output to the memory.

11. The memory module according to claim 9 wherein the address generator includes:
   a register configured to temporarily store the highest order bit of the row address output by the memory controller;
   an output selector configured to select either the highest order bit of the row address output by the memory controller, or the highest order bit of the row address stored in the register, for output to the memory as the highest order bit of the column address to be utilized for identification of the memory cell targeted for access; and
   a command parser configured to parse command that specifies an access method to the memory based on row address strobe signal, column address strobe signal, and write enable signal output by the memory controller; and to output the parsed command to the register and to the output selector; wherein
   based on the command input from the command parser, the register stores the highest order bit of the row address and resets the highest order bit; and
   based on the command input from the command parser, the output selector outputs either the highest order bit of the row address output by the memory controller, or the highest order bit of the row address stored in the register.

12. The memory module according to claim 9 further comprising:
   nonvolatile memory adapted to save a parameter associated with the operating mode detected by the operating mode detector;
   wherein the address generating controller reads out the parameter that was saved to the nonvolatile memory, and controls the address generator on the basis of the parameter.

13. The memory module according to claim 12 wherein
   when a computer is initially started up after the memory module has been installed in the computer, the address generating controller saves to the nonvolatile memory the parameter associated with the operating mode detected by the operating mode detector, and
   when the computer is started up a second and subsequent times, the address generating controller reads out the parameter stored in the nonvolatile memory.

14. The memory module according to claim 10 wherein
   the operating mode detector detects the operating mode based on a clock signal, a chip select signal, a row address strobe signal, a column address strobe signal, and a write enable signal output by the memory controller.

15. The memory module according to claim 14 wherein
   the operating mode detector acquires the chip select signal, the row address strobe signal, the column address strobe signal, and the write enable signal, at each rising edge of the clock signal, and hold each of the signals,
   the operating mode detector detects that the operating mode is the first operating mode, if at least one of the row address strobe signal, the column address strobe signal, and the write enable signal that were acquired when the acquired chip select signal is "L" is different from the previously acquired row address strobe signal, column address strobe signal, or write enable signal, and
   the operating mode detector detects that the operating mode is the second operating mode, if (a) the row address strobe signal, the column address strobe signal, and the write enable signal that were acquired when the acquired chip select signal is "L" are respectively the same as the previously acquired row address strobe signal, column address strobe signal, and write enable signal; and additionally (b) at least one of the previously acquired row address strobe signal, column address strobe signal, and write enable signal is different from the row address strobe signal, the column address strobe signal, or the write enable signal that were acquired the time before.

16. The memory module according to claim 15 wherein
   the operating mode detector performs detection of operating mode multiple times; and
   when a number of times that the first operating mode is detected or a number of times that the second operating mode is detected is greater than half the number of multiple times, the operating mode detector determines the operating mode that was detected the number of times greater than half the number of multiple times to be the operating mode of the memory controller.

17. An auxiliary module connected to a memory controller and to a memory module, and adapted to relay exchanges of signals and data between the memory controller and the memory module, wherein the memory module is furnished with memory that has a plurality of banks containing a plurality of memory cells arranged in a matrix array, wherein each of the memory cells that is targeted for access is identified on the basis of a bank address composed of a prescribed number of bits, a row address composed of a prescribed number of bits, and a column address composed of a prescribed number of bits, the addresses being input from the memory controller, wherein
   the auxiliary module comprises:
   an address generator configured to be able to generate a highest order bit of a bank address to be utilized for identification of the memory cell targeted for access, using a highest order bit of a row address that is output by the memory controller, and to be able to output the highest order bit of the bank address to the memory, in case where
      (i) a sum of a number of bits of the bank address, a number of bits of the row address, and a number of bits of the column address that have been output by the memory controller is equal to a sum of the number of bits of the bank address, the number of bits of the row address, and the number of bits of the column address that are utilized for identification of the memory cell targeted for access;
      (ii) the number of bits of the row address that is output by the memory controller exceeds by one the number of bits of the row address that is utilized for identification of the memory cell targeted for access; and
      (iii) the number of bits of the bank address that is output by the memory controller is less by one than the number of bits of the bank address that is utilized for identification of the memory cell targeted for access;
   an operating mode detector configured to detect an operating mode of access to the memory by the memory controller; and
   an address generating controller configured to control the address generator based on the operating mode detected by the operating mode detector.

18. An auxiliary module connected to a memory controller and to a memory module, and adapted to relay exchanges of signals and data between the memory controller and the memory module, wherein the memory module is furnished with memory that has a plurality of banks containing a plurality of memory cells arranged in a matrix array, wherein each of the memory cells that is targeted for access is identified on the basis of a bank address composed of a prescribed number of bits, a row address composed of a prescribed number of bits, and a column address composed of a prescribed number of bits, the addresses being input from the memory controller, wherein the auxiliary module comprises:

an address generator configured to be able to generate a highest order bit of a column address to be utilized for identification of the memory cell targeted for access, using a highest order bit of a row address that is output by the memory controller, and to be able to output the highest order bit of the column address to the memory, in case where (i) a sum of a number of bits of the bank address, a number of bits of the row address, and a number of bits of the column address that have been output by the memory controller is equal to a sum of the number of bits of the bank address, the number of bits of the row address, and the number of bits of the column address that are utilized for identification of the memory cell targeted for access;

(ii) the number of bits of the row address that is output by the memory controller exceeds by one the number of bits of the row address that is utilized for identification of the memory cell targeted for access; and (iii) the number of bits of the column address that is output by the memory controller is less by one than the number of bits of the column address that is utilized for identification of the memory cell targeted for access;

an operating mode detector configured to detect an operating mode of access to the memory by the memory controller; and an address generating controller configured to control the address generator based on the operating mode detected by the operating mode detector.

* * * * *